United States Patent

[11] 3,601,699

[72] Inventors Roscoe A. Norton, Jr.;
William M. Carrozza, both of Batesburg, S.C.

[21] Appl. No. 816,690
[22] Filed Apr. 16, 1969
[45] Patented Aug. 24, 1971
[73] Assignee Westinghouse Air Brake Company
Swissvale, Pa.

[54] LEAD SEPARATOR AND MOUNTING SOCKET FOR MICROMINIATURE DEVICES
5 Claims, 3 Drawing Figs.

[52] U.S. Cl. ........ 324/158 F, 339/66 T, 339/193
[51] Int. Cl. ........ G01r 31/22, H01r 13/20
[50] Field of Search ........ 324/158 F; 339/66 T, 193, 17

[56] References Cited

UNITED STATES PATENTS

| | | | |
|---|---|---|---|
| 2,858,515 | 10/1958 | Thunander | 339/17 |
| 3,325,772 | 6/1967 | Suverkropp | 339/193 |
| 3,414,869 | 12/1968 | Pascua | 339/193 |
| 3,408,612 | 10/1968 | Bute et al. | 324/158 X |

OTHER REFERENCES

Cochran et al., IBM Tech. Discl. Bul., Oct. 1963, pp. 44, 45.

*Primary Examiner*—Alfred E. Smith
*Attorneys*—H. A. Williamson, A. G. Williamson, Jr. and J. B. Sotak

ABSTRACT: This disclosure relates to testing apparatus employing a component lead separator for receivingly entrapping yet physically exposing a portion of the relatively long conductive leads of a microminiature component. The lead separator is quickly and easily inserted into a mounting socket which includes a plurality of spring contact elements for electrically engaging the exposed portions of the conductive leads. The spring contact elements are, in turn, connected to an electrical analyzer for measuring and testing the electrical and operating characteristics of the microminiature component.

INVENTORS
Roscoe A. Norton, Jr.
William M. Carrozza.
BY
John B. Sotak

LEAD SEPARATOR AND MOUNTING SOCKET FOR MICROMINIATURE DEVICES

Our invention relates to a testing arrangement and more particularly to apparatus for making certain tests on microminiature components in a quick yet an efficient manner.

It is common practice in the construction of electrical and electronic devices to perform various tests for positively determining whether or not a particular device is acceptable for its intended use. For example, in the manufacturing of TO–5 microminiature relays, each of the relays is subjected to certain electrical checks, such as internal resistance contact and coil tests, pickup and dropout characteristic tests, isolation test, etc., in order to absolutely ensure that they meet the standards set form in Mil-Specs applications. However, it will be appreciated that time is of the essence in any testing operation and, therefore, it is highly advantageous to perform the various tests as rapidly and efficiently as possible. It is especially desirable to make the various electrical tests on the microminiature relays simultaneously and preferably without the need of separately interconnecting the leads of the test instruments to the individual conductive leads of the relay. Accordingly, it has been found advantageous to employ a testing arrangement utilizing a mounting socket and component lead separator for quickly and easily establishing electrical contact between the conductive leads of the relay and the contact elements of the socket. It is also highly desirable that the component lead separator entraps the electrical leads of the component yet exposes the electrical leads along their entire length so that the contact elements of the mounting socket may intimately engage the component leads at a point near their emergence from the base of the component. Such an arrangement also minimizes the possibility of physical damage to the conductive leads and the relay itself since the lead separator prevents bending and twisting of relay leads and, therefore, eliminates undue stresses and strains from being applied to the fragile glass seals surrounding the conductive leads.

Accordingly, it is an object of our invention to provide new and improved apparatus for quickly and easily testing microminiature devices.

Another object of our invention is to provide a unique relay testing arrangement employing a mounting socket and a component lead separator.

A further object of our invention is to provide an improved apparatus which minimizes the chance of physical damage to microminiature devices during testing procedures.

Yet another object of our invention is to provide an improved testing arrangement employing a component lead separator which protects its electrical leads against damages yet exposes the leads along their entire length so that the contact elements of a mounting socket may readily and intimately engage the component leads at any point along their entire length.

Yet a further object of our invention is to provide an improved testing apparatus employing a mounting socket which not only rigidly holds a component lead separator in place but also provides improved surface-to-surface contact between the conductive leads of the component and the contact elements of the socket.

Still another object of our invention is to provide an improved relay testing arrangement which is economical in cost, reliable in operation, durable in use and efficient in service.

A further object of this invention is to provide an insulative lead separator having an elongated body which includes a plurality of elongated circularly disposed peripheral grooves for mechanically holding the conductive leads of an electrical device in place while physically exposing a portion of the conductive leads along the entire length.

Still yet a further object of our invention is to provide a unique component lead separator receiving socket including an annular supporting portion and a hollow barrel receiving portion having a plurality of circularly disposed internal grooves in a plurality of aligned radially extending slots for accommodating the plurality of flexible contacts.

Further objects, features and advantages of our invention will become apparent as the following description proceeds and the ingenuity and novelty which characterizes our invention will be pointed out particularly in the appended claims which form part of our specification.

Generally, our invention relates to a testing arrangement for quickly and efficiently measuring the electrical and operating characteristics of a microminiature relay. The testing arrangement includes an elongated insulative lead separator cooperatively associated with the relatively long electrical leads of the microminiature relay. The lead separator includes a plurality of circularly disposed semienclosed peripheral grooves which entrap yet expose a portion of the relatively long conductive leads along their entire length. A receiving socket having an insulative body provided with an inner upstanding central receiving barrel and an outer annular supporting base is employed to cooperate with the lead separator. The receiving socket includes a plurality of circularly disposed spring contact elements which are resiliently urged toward the center of the central receiving barrel. The respective ends of the spring contact elements are connected through appropriate leads to testing apparatus which includes the necessary meters for testing the pickup and dropout characteristics, the resistive coil and contact values, and the insulative qualities of the microminiature relay. The lead separator is inserted in the central receiving barrel so that the spring contact elements directly engage the exposed portions of the conductive leads of the microminiature relay at or near their emerging from the base of the microminiature relay.

A better and more complete understanding of our invention will be had by reference to the drawings in which similar characters of reference refer to similar parts throughout the several views in which.

Figures 1, 2, 3:
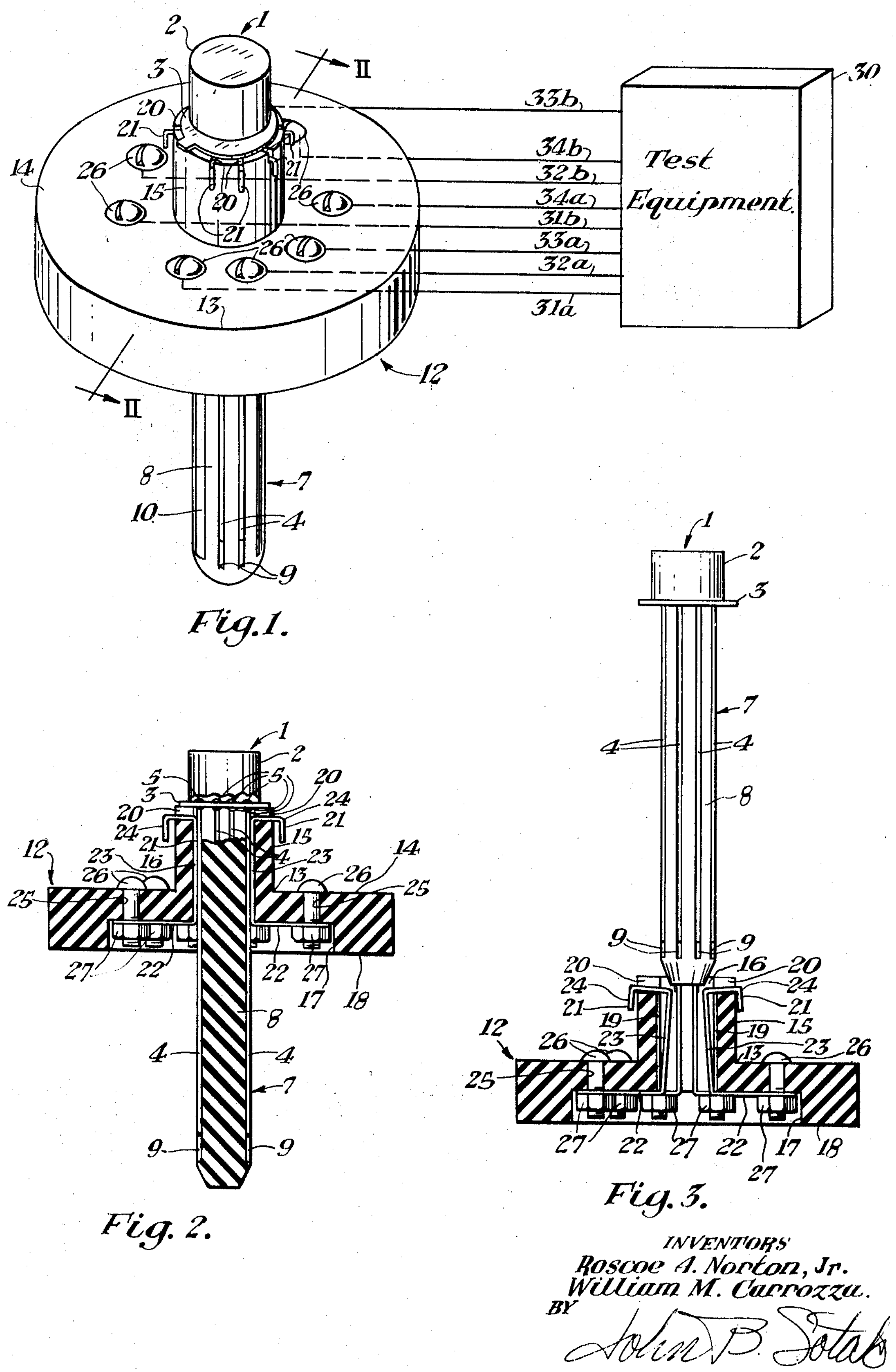
FIG. 1 is a perspective view of the present invention illustrating a microminiature device carried by a lead separator which is fully inserted in a mounting socket and which, in turn, is electrically connected to suitable testing equipment.
FIG. 2 is a cross-sectional view taken substantially along line II–II of FIG. 1.
FIG. 3 is a partial cross-sectional view similar to FIG. 2 except that the lead separator is shown removed from the mounting socket.

Referring now to the drawings, and in particular to FIG. 1, there is shown a testing arrangement for measuring the electrical and operating characteristics of a multilead type of microminiature device generally designated by character 1. In the present instance the microminiature device 1 preferably is an electromechanical relay of the type shown and disclosed in copending U.S. Pat. application Ser. No. 734,307, filed June 4, 1968, entitled Microminiature Relay which is assigned to the assignee of the subject application. As noted in the above-mentioned application, the relay 1 comprises a transistor type eight (8) lead TO–5 cased relay having an electromagnetic assembly and a transfer contact assembly in the form of a double-pole double-throw switch. The internal elements of the relay 1 are hermetically sealed by soldering or welding a suitable cover or casing 2 to the relay base or head plate 3. The electrical connections from inside the microminiature relay are established by a plurality of circularly exposed relatively long conductors or leads 4 which pass through and project outwardly from the bottom of the base or header plate 3 of the relay 1.

As shown in FIG. 2, each of the relatively long electrical leads 4 is secured in place by being embedded in a fused mass of suitable insulative material 5, such as glass, which suitably fills and insulates each of the conductors 4 from the metallic base or header plate 3. While the glass seals 5 have highly favorable electrical characteristics, such as, insulative qualities, they are extremely fragile and therefore susceptible to being fractured when excessive strain or extraneous stresses are incident thereon. It is also quite obvious that since the electrical leads are relatively long, they are quite easily bent or twisted out of shape during normal fabrication and testing procedures unless precautionary measures are taken to prevent such damage. Accordingly, it has been found advantageous in the manufacturing of the microminiature relays to employ a lead protecting device, such as a lead separator, which protects the relay from being physically damaged yet exposes a portion of the leads for testing purposes.

As shown, the lead separator generally characterized by numeral 7 comprises a molded elongated cylindrical body 8 which is formed of suitable insulative material, such as, "-Nylon." The elongated cylindrical body 8 includes a plurality of circularly spaced semienclosed grooves or slots 9 formed on the peripheral surface thereof. It will be appreciated that the circumferential or angular spacing of the semienclosed grooves 9 corresponds with the circular disposition of the conductive leads 4 of the relay 1. Thus, in the present instance a total of eight (8) semienclosed grooves 9 are formed on the circumference of the elongated cylindrical body 8 since as previously mentioned the presently described lead separator 7 is adapted to accommodate an eight (8) lead TO–5 cased electromagnetic relay. In actual practice, each of the semienclosed grooves 9 comprises an inner circular bore (not characterized) which is contiguous along its entire length with an outer semicircular bore. That is, a common chord exists between the inner circular bore and the other semicircular bore of each groove so that the leads of the relay are trapped within the inner circular bores yet are exposed along their entire length by the outer semicircular bores. As shown in FIGS. 2 and 3, one end of the lead separator is provided with a flat surface which is adapted to cooperate with the flat underside of the relay base 3. Further, the open ends of each of the semienclosed channels or grooves 9, namely, the inner cylindrical bores is slightly enlarged or tapered so that the conductive leads 4 of the relay 1 may be more easily inserted into the inner cylindrical bores. As shown, the remote end of the lead separator body 8 preferably is tapered in order to facilitate the insertion of the lead separator into an appropriate mounting socket 12, as will be described hereinafter. It will be noted in viewing FIG. 1 that a suitable bossed key 10 is formed on the peripheral surface of the lead separator 7. The key 10 extends substantially along the entire length of the elongated cylindrical body and facilitates orientation of the lead separator 7 with respect to the mounting socket 12.

The mounting socket 12 which receives the lead separator 7 comprises a one-piece insulative body constructed of suitable insulative material, such as, "Teflon." The insulative body 13 is preferably initially formed from a molded blank which is finally machine finished to include an outer flange portion 14 and an inner upstanding central shoulder portion 15. The outer flange portion 14 forms the base or supporting member for mounting purposes, as will be described presently. As shown in FIGS. 2 and 3, the central upstanding portion 15 includes a central receiving cavity or opening 16 which communicates with a suitable enlarged circular recess or counterbore 17 formed in the underside or bottom of the outer flange member 14. Thus, the outer angular flange 14 includes a substantially flat annular surface 18 by which the socket may be conveniently seated and securely fastened in any appropriate manner to a test bench or the like. Accordingly, the socket 12 takes the form of an upper barrel receiving portion 15 and a lower annular flange supporting portion 14.

An indexing means, such as, a suitably shaped keyway (not shown) extends along the entire length of the inside wall of the cavity 16 for accommodating the key 10 of the lead separator 7. The inside wall of the central cavity 16 is also provided with a plurality of circularly spaced semicircular grooves, two of which are shown at 19, in FIG. 3. In the present instance, the number of semicircular grooves 19 is eight (8) which agrees with each of the eight (8) semienclosed grooves 9 of the lead separator 7 and the eight (8) leads 4 of the microminiature relay 1. As shown, the upper end of the central barrel receiving portion 15 is provided with a plurality of radially extending slots 20 which are arranged in line with the respective symmetrically disposed semicircular grooves 19, the purpose of which will be described presently.

In the arrangement shown, the mounting socket 12 also includes a plurality of spring contact elements 21 preferably constructed of suitable electrical conductive resiliently flexible material, such as, beryllium-copper wire. Each of the spring contact elements 21 is also preferably gold plated in order to improve the electrical contact characteristics. As shown, each of the plurality of contact elements 21 includes a lower horizontal terminal portion 22, intermediate vertical engaging portion 23, and an upper reverse bend or hook portion 24. The hook portion 24 of each contact element 21 is shown disposed within the respective slot 20 formed in the upper end of the hollow receiving barrel portion 15, and the intermediate engaging portion 23 of each contact element 21 extends downwardly through the central cavity 16, while the terminal portion 22 of each contact element 21 is positioned beneath and adjacent the under surface of circular recess 17. The terminal portion 22 of each contact element 21 is provided with an eyelet (not depicted) which is positioned in alignment with each one of the eight (8) holes, two of which are shown at 25, in FIGS. 2 and 3 formed in the outer flange portion 14. A screw 26 and nut 27 securely hold each of the contact elements 21 in proper relation and provide a convenient connecting point to which the electrical lead of an external circuit may be securely fastened.

As shown in FIG. 3, the contact elements 21 are normally urged and biased toward the center of the central cavity 16 by the resiliency of the spring wires. That is, the spring contact elements 21 are initially formed to have an obtuse angle existing between the intermediate portion 23 and the terminal portion 22 so that when the hook portion 24 of the contact elements is positioned within the slot 20 and the terminal portion 24 is securely fastened relative to the flange portion 14 by screws 26 and nuts 27, a biasing force urges the springs to assume a position as shown in FIG. 3. It will be noted that the amount of inward movement of the spring contact elements is limited by engagement of the end of the hook portions 24 with the outer surface of the central receiving portion 15. It will also be appreciated that the slots 20 operate as guides for reducing lateral movement of the spring contact elements which may take place during the assertion and retraction of the component lead separator 7. Accordingly, binding and misalignment problems are minimized during insertion and extraction. Further, as shown in FIG. 2, each of the semicylindrical grooves 16 accommodates substantially one-half of each of the intermediate portions 23 of the contact elements 21 and thereby provides a convenient seat when the component lead separator 7 is inserted into the socket 12.

It has been found advantageous to unite the lead separator and the relay as soon as conditions allow. Therefore, it is common practice to combine and insert the leads 4 of the microminiature relay 1 into the semienclosed grooves 9 of the lead separator 7 as soon as the leads 4 are fused to the header plate 3 so that no damage will occur during the subsequent fabricating steps. It will be appreciated that lead separator 7 will remain intact with the relay 1 at least until after the testing procedures have been completed. For example, after the final assembly of the relay 1 is completed, the relay and separator are normally transferred, as a unit, to a suitable testing location wherein the operating, electrical and insulative or dielectric characteristics, such as, pickup and dropout armature voltages and currents, the coil resistance, the contact resistance and the isolation properties between the various elements are measured and compared to a given standard for that particular type of relay.

Let us assume that the above-mentioned relay is ready to undergo the above-mentioned tests and that the lead separator 7 and relay 1 are available for insertion into the test socket 12 as shown in FIG. 3. Now then, the cover 2 of the relay 1 is simply grasped by the tester and turned until the bossed key 10 and the keyway are brought into alignment with each other, and then the lead separator 7 and the leads 4 of the relay 1 are simply pushed into the central receiving cavity 16. It will be appreciated that the tapered end of the lead separator 7 facilitates its entry into the cavity 16. Upon the initial insertion of the lead separator 7 into the cavity, the tapered end begins spreading the spring contact elements 21 outwardly toward the semicircular grooves 19 formed on the internal wall of the central receiving barrel portion 15. As the lead separator 7 is pushed further into the central receiving cavity 16, the intermediate portions 23 of the spring contact elements 21 will enter the outer semicylindrical bores of grooves 9 of the lead separator 7. Next, as the telescopic sliding action continues, the outer surfaces of the intermediate portions 23 of the spring contact elements 21 begin engaging the exposed portions or surfaces of the conductive leads 4 so that a rubbing and cleaning effect occurs between each of the two contiguous surfaces. The resiliency of the spring contacts 21 enhances the frictional contact and ensures any dirt or grit is effectively removed from the surfaces of the relatively long conductive leads 4. Therefore, good electrical contact will always exist between the intermediate portions 23 of the spring contact elements 21 and the conductive leads 4 so that, little if any resistive loss occurs at the contacting surface.

As shown in FIGS. 1 and 2, the lead separator 7 is normally pushed as far as possible into the socket 12 to a point where the header plate 3 of relay 1 engages the upper surface of the central upstanding portion 15. It will be noted in viewing FIG. 2 that when the lead separator 7 is completely inserted into socket 12, the intermediate portions 23 of spring contact elements 21 will intimately engage the conductive leads 4 at or near the point where they emerged from the head plate 3. It will be appreciated that by electrically contacting the relatively long conductive leads 4 near the point of emergence, the resistance of the conductor becomes negligible and therefore, very little, if any, losses occur during the testing of the relay characteristics. The resilient force of the spring contact elements 21 is employed not only for assisting in frictionally cleaning and electrically contacting the leads 4 but also for aiding in more rigidly holding relay 1 and lead separator 7 within the socket 12.

The various operational, electrical and dielectrical tests are illustrated as being conducted in a substantially simultaneous manner by means of suitable relay analyzer or test equipment 30. The test equipment 30 may take the form of a conventional switch controlled multimeter or may be made up of a plurality of individual meters, such as, a voltmeter, an ammeter, ohmmeter, etc., for testing and measuring the voltage, current, resistance, isolation characteristics, etc. of the relay 1. It will be understood that the test equipment 30 is preferably permanently connected to the spring contact elements 21 of socket 12 by means of a plurality of wires or leads **31*a*, 31*b*, 32*a*, 32*b*, 33*a*, 33*b*, 34*a* and 34*b*. Thus, for example, as seen in FIG. 1, the equipment 30 is connected to the electromagnetic coil of relay 1 by the leads 31*a* and 31*b* which are connected by the associated screws 26 and nuts 27 to terminal portions 22 of the appropriate spring contact elements 21. In a similar manner, the movable heel contacts of the double-pole double-throw transfer switching arrangement are connected by leads 32*a* and 32*b* to equipment 30, while the associated front and back contacts of the switching assembly are connected by leads 33*a* and 33*b*, 34*a* and 34*b*, respectively. Accordingly, a definite circuit is established between the testing equipment 30 and the various elements of the microminiature relay 1 so that the various elements of the microminiature relay 1** so that the various test may be readily completed within a minimum of time.

After the pickup, dropout, the resistance, and the insulative characteristics have been completed, the tested relay may be simply pulled and removed from the socket 12 and another relay and lead separator for test may be readily inserted therein and the tests repeated.

From the foregoing, it will be appreciated that the new and improved test arrangement of the present invention provides for a method of quickly and easily testing a microminiature type of electrical component with a minimum of effort. It will also be noted that the presently described testing apparatus provides a highly effective yet inexpensive arrangement for testing microminiature relays which results in improved contact with the electrical leads of the relays and in maximum protection against damage to the leads during the testing procedure.

Having thus described my invention, what I claim is:

1. In combination, an electrical device having a plurality of elongated electrical leads projecting from the base thereof, a lead separator having an insulative body provided with a plurality of spaced peripheral grooves for accommodating each of said plurality of elongated electrical leads, and a socket having an insulative body provided with a central receiving opening, a plurality of spaced contact elements, said central receiving opening having a plurality of circularly spaced semicircular grooves for accommodating an intermediate portion of said spaced contact elements, and a plurality of aligned radially extending slots for guidingly receiving an upper hook portion of said spaced contact elements said intermediate portions cooperating with said plurality of spaced peripheral grooves for electrically contacting said elongated electrical leads at a point adjacent the base of said electrical device.

2. A combination as defined in claim 1, wherein said contact elements are adapted to be connected to electrical measuring equipment for testing the electrical characteristics of said electrical device.

3. A combination as defined in claim 1, wherein each of said plurality of contact elements is normally urged toward the center of said central receiving opening so that said contact elements resiliently frictionally engage said elongated electrical leads of said electrical device.

4. A combination as defined in claim 1, wherein said insulative body of said lead separator is tapered at one end in order to facilitate reception of said lead separator into said central receiving opening of said socket.

5. A combination as defined in claim 1, wherein said insulative body of said socket is in the form of an upper upstanding barrel receiving portion and a lower annular supporting portion.

PO-1050
(5/69)

UNITED STATES PATENT OFFICE
CERTIFICATE OF CORRECTION

Patent No. 3,601,699 Dated August 24, 1971

Inventor(s) Roscoe A. Norton Jr. and William M. Carrozza

It is certified that error appears in the above-identified patent and that said Letters Patent are hereby corrected as shown below:

Column 6, line 37 after elements insert ","

Signed and sealed this 7th day of March 1972.

(SEAL)
Attest:

EDWARD M.FLETCHER,JR.
Attesting Officer

ROBERT GOTTSCHALK
Commissioner of Patents